Patented Sept. 9, 1941

2,255,252

UNITED STATES PATENT OFFICE 2,255,252

ORGANIC NITROGENOUS BASE DERIVATIVES OF ETHER DERIVATIVES AND METHOD OF MAKING SAME

Benjamin R. Harris, Chicago, Ill.

No Drawing. Original application February 11, 1938, Serial No. 190,135. Divided and this application May 1, 1939, Serial No. 271,102

11 Claims. (Cl. 260—295)

My invention relates to new chemical compounds of the quaternary ammonium type which are characterized by possessing interface modifying properties rendering the same highly useful for the purposes for which such agents are employed in the various arts. The invention also covers certain intermediates as well as methods of preparing the compounds.

The novel compounds, in general, fall within the scope of the general formula

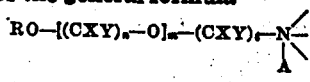

wherein R is a higher molecular weight organic radical, X and Y are hydrogen, or hydroxy or other anions such as halogen, sulphonic, sulphate, phosphate, borate, or the like, A is an anion, preferably of a solubilizing character, $n$ and $t$ are whole numbers, preferably 2, 3 or 4, $m$ is a whole number, preferably 1, 2, 3 or 4 although it may be much higher, and at least one of the three indicated valence bonds attached to nitrogen is satisfied by a radical of the class consisting of alkyls, cycloalkyls, alkylols, aralkyls, aryls, aralkylols and the radical of a heterocyclic ring of which the nitrogen is a member.

A more limited aspect of my invention may be represented by the general formula

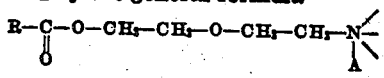

wherein R is a hydrocarbon radical or substituted hydrocarbon radical containing at least five and preferably from eleven to seventeen carbon atoms.

The radical R in the above formula may be of aliphatic, cycloaliphatic, aromatic or aromatic-aliphatic character, as will be pointed out hereinafter, but it is preferred that it be aliphatic and of higher molecular weight.

In order that the nature of the invention may become apparent, I list hereinbelow representative compounds which fall within the scope of my invention.

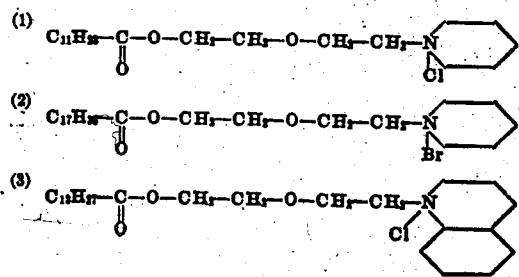

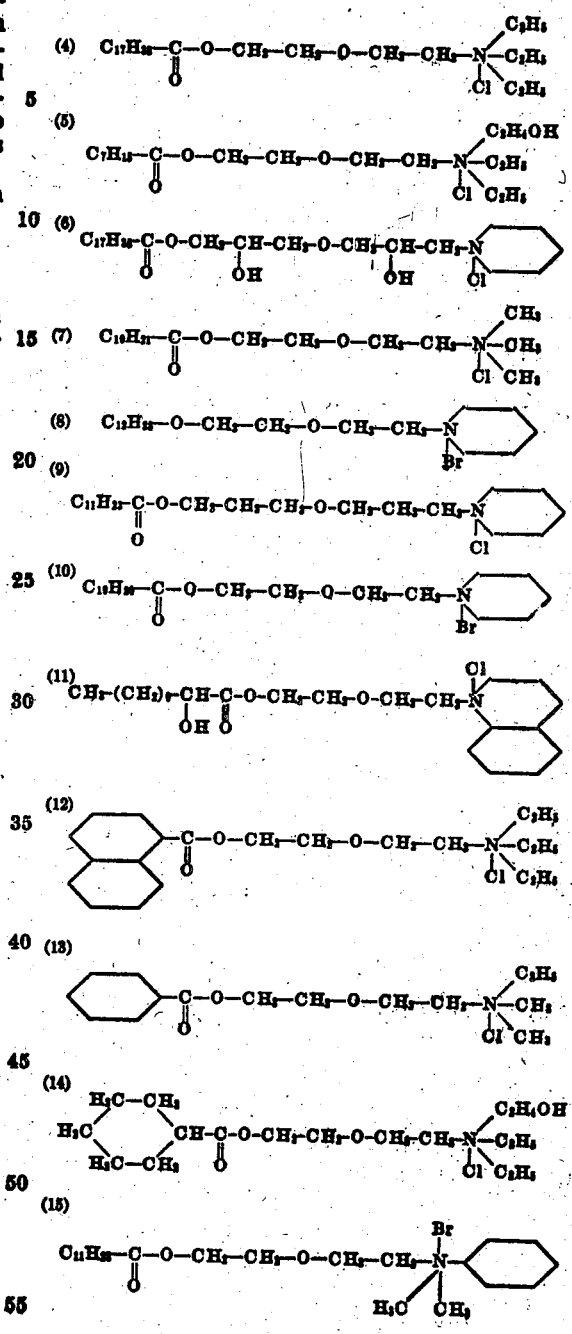

(16) 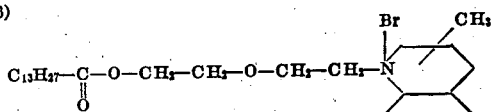

(17) 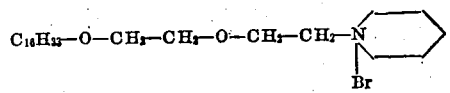

(18) 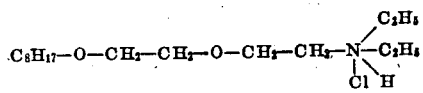

(19) 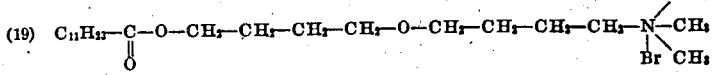

(20) 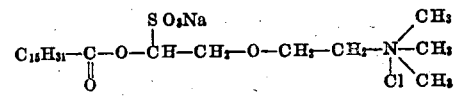

(21) 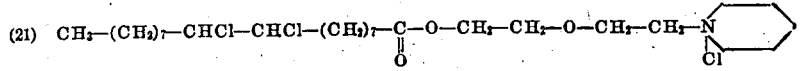

(22) 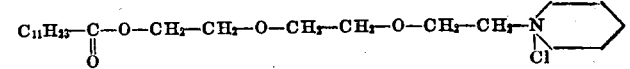

(23) 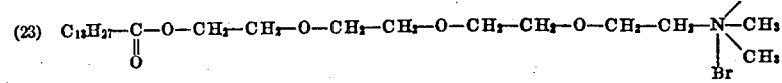

(24) 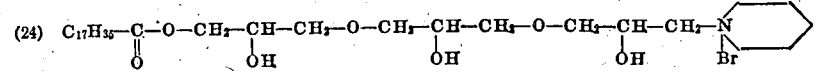

(25) 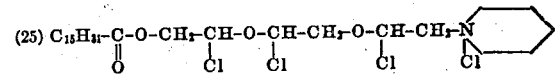

(26) 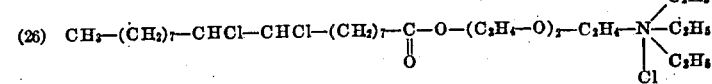

(27) 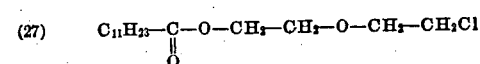

(28) 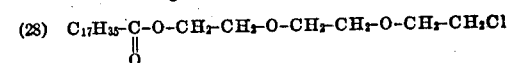

(29) 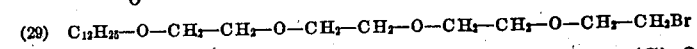

soap was then dried for 72 hours in an oven at 110–150 degrees C.

(B) 50 parts by weight of the soap, as prepared in part (A) were mixed with 100 parts by weight of symmetrical dichlorethyl ether and the mixture was refluxed for 2 to 3 hours at the boiling point of the solution. The soap gradually went into solution and a final precipitate comprising sodium chloride collected at the bottom of the vessel. The solution darkened considerably as soon as all of the soap had dissolved. When the reaction was completed, the solution was decanted from the sodium chloride precipitate and the excess dichlor ethyl ether was removed by distillation in vacuo at 150–170 degrees C. The resulting product was a clear brown liquid.

The following examples are illustrative of methods which I have found suitable for preparing various of the compounds which I disclose herein. It will be appreciated that other methods may be utilized, that the proportions of reacting ingredients, times of reaction, and temperatures may be varied and that supplementary processes of purification and the like may be resorted to wherever found desirable or convenient. These and other variations and modifications will be evident to those skilled in the art in the light of the guiding principles which I disclose herein.

*Example A*

Mixed cocoanut oil fatty acid mono ester of diethylene glycol pyridinium chloride.

(A) 100 parts by weight of cocoanut oil mixed fatty acids were dissolved in 200 parts by weight of 95% ethyl alcohol and the solution was then neutralized to phenolphthalein with alcoholic potash. The alcohol was then removed by evaporating on a boiling water bath and the resulting (C) 25 parts by weight of said clear brown liquid as produced in part (B) were dissolved in 25 parts by weight of pyridine and heated on an oil bath for about 5 hours at 170 degrees C. until the material in the reaction vessel became viscous. It was then heated for an additional 3 hours after which the excess pyridine was removed by distillation in vacuo at 125 degrees C. A dark product was obtained, at least the predominant portion of which corresponded to the following formula:

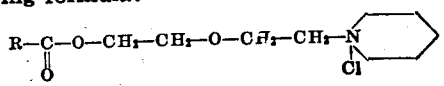

wherein RCO corresponds to the acyl radicals found in cocoanut oil mixed fatty acids.

*Example B*

Mono oleic acid ester of diethylene glycol pyridinium chloride.

(A) 20 parts by weight of dried sodium oleate were refluxed with 100 parts by weight of symmetrical dichlor ethyl ether at the boiling point of the mixture for about 4 hours. When the reaction was completed, the solution was decanted from the sodium chloride which had precipitated and the excess dichlor ethyl ether was removed by distillation in vacuo at 160-170 degrees C.

(B) The resulting product was then reacted with an equal amount of pyridine as described in Example A. The final product consisted predominantly of a compound having the following formula:

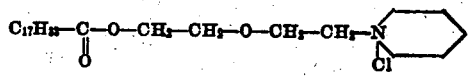

Example C

Mono stearic acid ester of diethylene glycol pyridinium chloride.

This product was made in the same way as described hereinabove in Example B, employing the same proportions of reactants, using sodium stearate in place of sodium oleate.

Instead of preparing the soaps as described in part A of Example A, an alternative procedure has proved highly satisfactory. In accordance with this latter procedure, higher fatty acids, such as lauric acid or cocoanut oil mixed fatty acids, are melted and introduced into a hot aqueous solution of alkali such as potassium hydroxide or sodium hydroxide, the mass being stirred until combination of the fatty acids with the alkali has taken place to form soap. The alkali should preferably be used in stoichiometric amounts to form the soap. To the hot, aqueous soap solution, common salt is added until the soap separates out, the salt solution then being separated from the soap. The soap solidifies at room temperature to a crumbly mass which loses its water easily by drying in air. To facilitate the drying, the air may be heated slightly. This soap product may then be reacted with dichlorethyl ether and then with pyridine, as described in parts B and C of Example A. The final product, when prepared from lauric acid soap or soaps of cocoanut oil mixed fatty acids, as just described, possesses useful properties in ore flotation operations, particularly for separating quartz and feldspar. In this connection, the pH of the flotation circuit should preferably be between 7 and 9, under which conditions the silica floats ahead of the feldspar and good separations can be made by controlling the amount of the reagent.

It will be understood, particularly in the light of the examples hereinabove, that my novel compounds may contain one or more ether linkages. Thus, for example, in place of employing symmetrical dichlorethyl ether or the chlorhydrin of diethylene glycol (HO—CH₂—CH₂—O—CH₂—CH₂Cl)

as a starting material, I may utilize compounds having a plurality of ether linkages such as the following, by way of illustration:

(a) Cl—CH₂—CH₂—O—CH₂—CH₂—O—CH₂—CH₂—Cl (b) Br—CH₂—CH₂—CH₂—O—CH₂—CH₂—CH₂—O—CH₂—CH₂—CH₂—Br (c) HO—CH₂—CH₂—O—CH₂—CH₂—O—CH₂—CH₂—Cl (d) HO-CH₂-CH₂-O-CH₂-CH₂-O-CH₂-CH₂-O-CH₂-CH₂-Cl (e) Cl—C₃H₆—O—C₃H₆—O—C₃H₆—O—C₃H₆—Cl (f) 

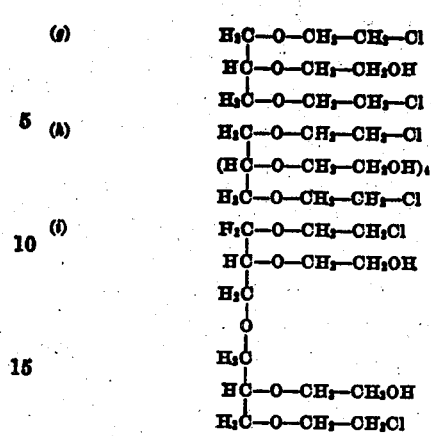

It is, of course, clear that methods other than those described may be employed for producing the novel compounds of my invention. Thus, for example, chlorhydrins or halogenhydrins of diethylene glycol (ClCH₂—CH₂—O—CH₂—CH₂OH) and similar halogen derivatives of polyglycols, polyglycerols and the like may initially be reacted with higher fatty acids or the like to produce esters in accordance with the following reaction:

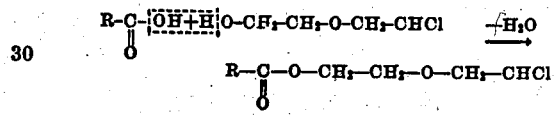

The resulting product may then be reacted with an organic nitrogenous base such as pyridine to produce the compounds of my invention. Still other methods will suggest themselves to those versed in the art in the light of my teachings herein.

At this time, it may also be pointed out that all of the products of my invention possess utility in ore flotation and ore separation processes. They appear to function as cationic reagents and, in general, function effectively in a circuit having pH between about 4 and 7 where, for example, they serve as collectors for silica. At a pH of 5 to 6, for example, silica may be floated away from kyanite and from other similar silica-containing ores.

As Examples 8, 17 and 18 show, my compounds may also comprise higher molecular weight ether derivatives. The higher molecular weight ethers may be prepared, for example, by reacting a compound containing a reactive halogen, for example, dichlor ethyl ether

with an alkali metal alcoholate such as sodium laurylate (C₁₂H₂₅—ONa) in accordance with general methods known in the art. The resulting compound may then be treated with pyridine or other desired nitrogenous base to produce compounds in accordance with my invention. In general, I find that the higher molecular weight esters are more satisfactory for most purposes.

The higher molecular weight organic radical represented by R in the general formulae may, as stated, be derived from various sources. Among such sources may be mentioned straight chain and branched chain higher molecular weight carboxylic, aliphatic, and fatty acids, saturated and unsaturated, such as caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as 1-hydroxy stearic acid, dihydroxystearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid and abietic acid; aromatic acids such as phthalic acid, benzoic acid, naphthoic acid, pyridine carboxylic acids; hydroxy aromatic acids such as salicyclic acid, hydroxy benzoic and naphthoic acids, and the like; and substitution and addition derivatives, particularly halogen substitution and addition derivatives of the aforementioned carboxylic substances. It will be understood that mixtures of any two or more of said acids may be employed if desired.

In those cases where the higher molecular weight organic radical is derived from alcohols, such alcohols include those corresponding to the higher molecular weight acids referred to hereinabove as well as others as, for example, aliphatic straight chain and branched chain alcohols such as hexyl alcohol, heptyl alcohol, octyl alcohol, nonyl alcohol, decyl alcohol, undecyl alcohol, lauryl alcohol, myristyl alcohol, cetyl alcohol, oleyl alcohol, linoleyl alcohol, stearyl alcohol, ricinoleyl alcohol, palmitoleyl alcohol, melissyl alcohol, ceryl alcohol, carnaubyl alcohol, myricyl alcohol, branched chain octyl, decyl, dodecyl, tetradecyl, hexadecyl and octadecyl aliphatic alcohols as, for example, 2-ethyl hexanol-1, 2-n butyl octanol-1, 2-butyl tetra-decanol-1, and, in general, the higher molecular weight saturated and unsaturated aliphatic straight chain and branched chain alcohols, preferably those corresponding to the fatty acids occurring in triglyceride oils and fats of vegetable or animal origin, natural or hydrogenated, such as corn oil, cottonseed oil, sesame oil, coconut oil, palm kernel oil, sunflower seed oil, lard, tallow, soya bean oil and the like, those alcohols containing from 12 to 18 carbon atoms being preferred. Other alcohols from which the radical R may be derived are cyclo-aliphatic or ali-cyclic alcohols such as the sterols, as, for example, cholesterol, iso-cholesterol, phytosterol, sitosterol, hydro-aromatic alcohols such as abietol, and such unsaturated alcohols as linalool, citronellol, geraniol and the like. Also included within the class of alcohols which may be employed are such compounds as the hydroxy and alpha-hydroxy higher aliphatic and fatty acids as, for example, ricinoleic acid, alpha-hydroxy stearic acid, alpha-hydroxy lauric acid, di-hydroxy stearic acid, 1-hydroxystearic acid, alpha-hydroxy palmitic acid, and the like, as well as esters of hydroxy-fatty acids, such as ethyl ricinoleate, castor oil, butyl alpha-hydroxy-stearate, cetyl hydroxystearate, and the like.

The term "alcohols," as employed herein, is intended to include alcohols which may or may not contain other groups such as carboxylic, halogen, sulphonic, sulphate, or other radicals. The alcohols obtainable by substituting alkyl or acyl radicals, preferably of high molecular weight, in place of the hydrogen of one or more hydroxy groups of polyhydroxy substances or polyhydric alcohols, it being understood that at least one hydroxy group attached to the nucleus of the polyhydroxy substance or polyhydric alcohol remains, are also within the scope of the alcohols which may serve as source materials for the radical R of my compounds. As examples of such alcohols may be mentioned, partially esterified or partially etherified sugars and sugar alcohols such as monolauric acid ester of sucrose, monostearic acid ester of dextrose, monopalmitic acid ester of mannitol, dicaproic acid ester of maltose, mono-octyl ether of sorbitol, monolauryl ether of pentaerythritol, monolauric acid ester of pentaerythritol, and the like; the monoglycerides and diglycerides, preferably of the higher fatty acids, as, for example, monolaurin, monomyristin, monostearin, distearin, diolein, dicaproin, mono-lauryl ether of glycerol, dicetyl ether of glycerol, monostearic acid ester of diethylene glycol, monolauric acid ester of ethylene glycol, and the like.

It is, of course, obvious that the alcohols may be prepared in accordance with any desired method. For example, many of these alcohols may be prepared by the so-called Bouveault and Blanc method or, alternatively, by the reduction or catalytic reduction with hydrogen of natural or hydrogenated animal or vegetable fats and oils in accordance with well known practices. Again the alcohols may be derived from synthetic processes such as by the oxidation of hydrocarbons or may be prepared by saponification of waxes and the like. Alternatively, they may be prepared by reduction of aldehydes or by the Grignard reaction.

It is likewise apparent that mixtures of the foregoing or other alcohols may be utilized as, for example, the mixture of alcohols resulting from the hydrogenation of coconut oil or the free fatty acids of coconut oil. Lauryl alcohol comprises about 45% of the total alcohol mixture, the remaining alcohols running from $C_8$ to $C_{18}$. Again, mixtures of alcohols such as are present in the so-called sperm oil alcohols, as well as those present in wool-fat, may equally efficaciously be utilized. Indeed, these higher molecular weight alcohols are generally offered on the market in the form of mixtures of different alcohols. These alcohols may be utilized, as previously indicated, in the form of alkali metal alcoholates for introducing a higher molecular weight alkyl or similar radical into the molecule to produce compounds falling within the scope of my invention.

It will be understood that, where the higher molecular weight esters are produced in accordance with the method described in the foregoing examples wherein my novel substances are prepared from halogen-containing compounds, the higher organic or fatty acids or the like are employed in the form of salts or soaps thereof. As in the case of the use of the alcohols and as previously indicated, mixtures of higher organic or fatty acids may be employed and, indeed, in commercial practice, it is found more convenient to do so than to attempt to obtain higher molecular weight acid fractions which consist primarily of only a single acid.

I have previously indicated that the anion represented by the letter A in the general formula illustrating the novel agents of my invention is preferably a solubilizing anion such as chlorine, bromine or iodine. Other anions may be substituted therefor as, for example, OH-, HSO$_4$-, RSO$_4$-, C$_6$H$_5$SO$_3$-, NO$_3$-, acetate, propionate, caproate, laurate, oleate, stearate, borate, phosphate, or some other organic or inorganic anion. As a general rule, I find the halogen derivatives to be particularly satisfactory.

The pentavalent nitrogen present in my new substances may be introduced into the molecule by means of various organic nitrogenous bases as, for example, alcohol amines and alkylol-, arylol- and aralkylol amines including mono-, di- and tri- ethanolamine and mixtures thereof such as are, for example, present in so-called commercial triethanolamine, propanolamines, butanolamines, pentanolamines, hexanolamines, glycerolamines, dibutyl ethanolamine, diethanol ethyl amine, cyclohexyl ethanolamine, diethanol cyclohexylamine, ethanol aniline, alkylol polyamines such as alkylol derivatives of ethylene diamine, mono-methyl mono-ethanolamine, diethyl-monoethanolamine, 1-amino-2, 3 propanediol, 1,2-diaminopropanol; alkylamines such as butyl amine, hexylamine, dimethylamine, ethylene diamine, diethylene triamine, triethylene tetra-amine, mono-methyl ethylene diamine, mono-ethyl diethylene tetra-amine, mono-allyl amine, aromatic and heterocyclic bases such as benzylamine, cyclo-hexylethylaniline, morpholine, pyridine, alkyl pyridines such as methyl-pyridine, piperidine, pyrrolidines, quinaldine, nicotine, and homologues and derivatives or substitution products thereof; mixtures of any two or more thereof, and the like. It will be understood that these organic bases, as in the case of triethanolamine, for example, may be employed in pure, impure, or commercial form.

The compounds of my invention have utility in various arts in which interface modifying agents are employed. Thus, for example, they may be utilized in the textile and related industries wherein they function for softening, wetting, detergent, emulsifying, penetrating, dispersing, frothing and foaming purposes. The textiles, the treatment of which with the agents of the present invention is rendered effective, comprise natural products such as cotton, wool, linen and the like as well as the artificially produced fabrics such as rayon, cellulose acetates, cellulose ethers and similar artificial silk fabrics. It will be understood, of course, that the agents may be used in aqueous and other media either alone or in combination with other suitable salts of organic or inorganic character or with other interface modifying agents. In the dyeing of textiles they may be employed as assistants in order to bring about even level shades. They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of cosmetic creams such as cold creams, vanishing creams, tissue creams, shaving creams of the brushless and lathering type and similar cosmetic preparations. Another use to which the agents of my invention may be placed is for the treatment of paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess marked utility in the ore dressing industry wherein they function effectively in froth flotation processes, particularly for the separation of silica from ores containing the same. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, shoe polishes, in rubber compositions, for breaking or demulsifying petroleum emulsions such as those of the water-in-oil type which are encountered in oilfield operations, and for various other purposes which will readily occur to those versed in the art in the light of my disclosure herein.

Wherever the term "higher" is employed as referring to higher molecular weight organic acids, it will be understood to cover at least six carbon atoms unless otherwise specifically stated.

This application is a division of my earlier application Serial No. 190,135, filed February 11, 1938, Patent 2,189,397.

What I claim as new and desire to protect by Letters Patent of the United States is:

1. The process of producing quaternary ammonium chemical compounds having the general formula

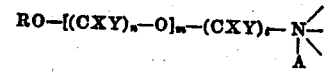

wherein R is a higher molecular weight acyl radical, X is hydrogen, Y is a member of the group hydrogen, hydroxy and inert anions, A is an anion, $n$, $m$ and $t$ are whole numbers and each of the three indicated valence bonds attached to nitrogen are linked directly to carbon which comprises the steps of reacting a salt of a higher molecular weight organic acid, a tertiary organic nitrogenous base, and a compound of the general formula

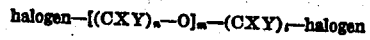

wherein X, Y and $n$, $m$ and $t$ have the foregoing significance.

2. The process of claim 1 wherein the reaction with the salt of the higher molecular weight organic acid is first permitted to proceed after which the resulting compound is reacted with the tertiary organic nitrogenous base.

3. The process of claim 1 wherein the salt of the higher molecular weight organic acid is a fatty acid soap and the tertiary organic nitrogenous base is pyridine.

4. The process of producing quaternary ammonium chemical compounds having the general formula

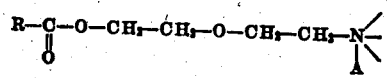

wherein

is a higher molecular weight acyl radical, A is an anion, and each of the three indicated valence bonds attached to nitrogen are linked directly to carbon, which comprises the steps of reacting a salt of a higher molecular weight organic acid, a tertiary organic nitrogenous base, and a compound of the general formula halogen—CH₂—CH₂—O—CH₂—CH₂—halogen 5. The process of producing the compound

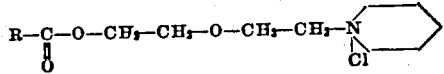

wherein

is a higher molecular weight acyl radical which comprises reacting symmetrical dichlordiethylether with a salt of a higher molecular weight aliphatic acid, and then reacting the resulting product with pyridine.

6. The process of claim 5 wherein the salt of the higher molecular weight aliphatic acid comprises a soap produced from higher fatty acids corresponding to those found in waxes and triglyceride oils and fats.

7. Quaternary ammonium compounds corresponding to the formula

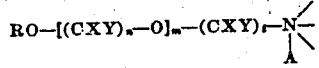

wherein R is a higher molecular weight aliphatic radical, X is hydrogen, Y is a member of the group hydrogen, hydroxy and inert anions, A is an anion, $n$, $m$ and $t$ are whole numbers, and each of the three indicated valence bonds attached to nitrogen are linked directly to carbon.

8. Quaternary ammonium chemical compounds corresponding to the formula

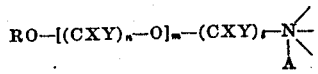

wherein R is an acyl radical containing between 12 and 18 carbon atoms, X is hydrogen, Y is a a member of the group hydrogen, hydroxy and inert anions, A is an anion, $n$, $m$ and $t$ are whole numbers, and each of the three indicated valence bonds attached to nitrogen are linked directly to carbon.

9. Quaternary ammonium chemical compounds corresponding to the formula

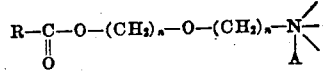

wherein R is a higher molecular weight alkyl radical, A is an anion, $n$ is a whole number, and each of the three indicated valence bonds attached to nitrogen are linked directly to carbon.

10. Chemical compounds in accordance with claim 7 wherein R is a fatty acid acyl radical containing from 12 to 18 carbons atoms and A is halogen.

11. Chemical compounds in accordance with the formula

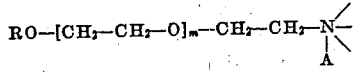

wherein R is a radical selected from the group consisting of higher molecular weight acyl and alkyl radicals, $m$ is a whole number, and A is an anion.

BENJAMIN R. HARRIS.